United States Patent
Wang et al.

(10) Patent No.: US 12,202,533 B1
(45) Date of Patent: Jan. 21, 2025

(54) DRIVING DEVICE FOR CAMPERVAN

(71) Applicant: Zhejiang Shimo technology Co. Ltd, Jinhua (CN)

(72) Inventors: Xiong Wang, Yongkang (CN); Jiawu Zhang, Wuhan (CN); Hua Wang, Yongkang (CN)

( * ) Notice: Subject to any disclaimer, the term of this patent is extended or adjusted under 35 U.S.C. 154(b) by 0 days.

(21) Appl. No.: 18/756,848

(22) Filed: Jun. 27, 2024

(30) Foreign Application Priority Data

Sep. 27, 2023 (CN) .......................... 202322655148.6

(51) Int. Cl.
*B62B 5/00* (2006.01)
(52) U.S. Cl.
CPC ..................... *B62B 5/004* (2013.01)
(58) Field of Classification Search
CPC . B62B 5/004; B62B 5/00; H02K 7/00; H02K 7/10
USPC ....................................... 180/65.51
See application file for complete search history.

(56) References Cited

U.S. PATENT DOCUMENTS

| | | | | |
|---|---|---|---|---|
| 7,284,628 B2* | 10/2007 | Pal | ............... | B62K 1/00 180/7.1 |
| 8,186,467 B2* | 5/2012 | Yoshino | ............... | B60K 17/046 903/910 |
| 8,932,166 B2* | 1/2015 | Suzuki | ............... | B60K 1/00 475/5 |
| 9,005,074 B2* | 4/2015 | Samways | ............... | B62L 5/00 475/299 |
| 11,293,502 B1* | 4/2022 | Thompson | ............... | F16D 55/16 |
| 2005/0072616 A1* | 4/2005 | Pal | ............... | B60K 7/0007 180/218 |
| 2009/0166112 A1* | 7/2009 | Yoshino | ............... | B60K 7/0007 180/65.51 |
| 2010/0187954 A1* | 7/2010 | Kendall | ............... | B60K 7/0007 310/67 R |
| 2010/0236848 A1* | 9/2010 | Loeber | ............... | F16C 35/06 475/348 |
| 2010/0326748 A1* | 12/2010 | Sgherri | ............... | B60K 17/046 301/6.5 |
| 2023/0133794 A1* | 5/2023 | Chen | ............... | H02K 7/14 180/220 |
| 2024/0215491 A1* | 7/2024 | Wei | ............... | A01D 34/00 |

FOREIGN PATENT DOCUMENTS

CN 113729565 A * 12/2021

OTHER PUBLICATIONS

Translation of CN-113729565-A accessed at www.espacenet.com on Sep. 17, 2024. (Year: 2021).*

* cited by examiner

*Primary Examiner* — James A Shriver, II
*Assistant Examiner* — Hilary L Johns

(57) ABSTRACT

A driving device for a campervan. The driving device includes a wheel hub, a motor, and a tire, where the tire is sleeved on the wheel hub and rotatable relative to the wheel hub, the motor is fixedly disposed on the wheel hub and configured to drive the tire to rotate through a transmission mechanism. An axis of the output shaft of the motor is parallel to an axis of the wheel hub. The transmission mechanism includes an active small gear fixedly connected to the output shaft of the motor, a driven large gear fixedly connected to the tire, and a reduction gear set rotatably disposed on the wheel hub and meshing with the active small gear and the driven large gear. The driven large gear is detachably arranged on the tire by means of a socket structure.

16 Claims, 6 Drawing Sheets

DRIVING DEVICE FOR CAMPERVAN

CROSS REFERENCE TO RELATED APPLICATION

This application claims priority benefit of Chinese patent Application No. 202322655148.6, filed on Sep. 27, 2023, and the entire contents of which are incorporated herein by reference.

TECHNICAL FIELD

The present disclosure relates to the technical field of campervans, and more specifically to a driving device for a campervan.

BACKGROUND

With most people paying more and more attention to outdoor health activities, globally, both outdoor energy storage, outdoor work, camping and wilderness activities, etc. have seen a spurt in demand. When camping, campers arrive at the camping site on foot or in a vehicle, usually in a valley, lakeside, or by the sea, where they can build a campfire, barbecue, have a picnic, or sing songs, which are the most common camping activities.

However, in the process of camping, the vehicle often cannot enter the camping site, and thus a lot of things, such as tents, food, etc., are usually required to be carried by a handcart, for moving to the camping site. The handcart can save energy and reduce the difficulty of carrying. However, traditional camping carts are not electrically assisted and rely on human power to tow them, which makes it difficult to tow the cart when it is carrying a large amount of weight, especially when climbing slopes and crossing grassy areas.

SUMMARY OF THE DISCLOSURE

The purpose of the present disclosure is to address the above problems of existing campervans, and to propose a driving device which drives the rotation of the wheels of the campervans by a motor for booster.

The objects of the present disclosure may be achieved by the following technical solutions.

A driving device for a campervan, comprising: a wheel hub, a motor, and a tire, where the tire is sleeved on the wheel hub and rotatable relative to the wheel hub, the motor is fixedly disposed on the wheel hub and configured to drive the tire to rotate through a transmission mechanism. The wheel hub includes a first hub frame and a second hub frame; the first hub frame defines a motor avoidance hole; the second hub frame is arranged with a motor mounting seat facing the motor avoidance hole, and the motor passes through the motor avoidance hole and is fixedly disposed in the motor mounting seat to be fixedly connected to the second hub frame. An axis of the output shaft of the motor is parallel to an axis of the wheel hub.

In some embodiments, the transmission mechanism comprises an active small gear fixedly connected to the output shaft of the motor, a driven large gear fixedly connected to the tire, and a reduction gear set rotatably disposed on the wheel hub and meshing with the active small gear and the driven large gear, respectively; the reduction gear set comprises two gear pairs meshing with each other, each gear pair comprising a large gear and a small gear fixedly connected to each other and disposed in coaxial alignment; the small gear in one of the two gear pairs meshes with the driven large gear, and the large gear in the other of the two gear pairs meshes with the active small gear; the one of the two gear pairs is denoted as a first gear pair, and the other of the two gear pairs is denoted as a second gear pair.

In some embodiments, the driven large gear is detachably arranged on the tire by means of a socket structure, the socket structure comprising a positioning disk fixedly connected to the driven large gear, a cam key fixedly disposed on the tire, and a positioning hole defined on the positioning disk; the positioning disk is sleeved on the cam key through the positioning hole; a cross-sectional shape of the positioning hole is adapted to a cross-sectional shape of the cam key.

In some embodiments, the output shaft of the motor passes through the motor mounting seat and extends outside of the second hub frame; a gear holder is fixedly arranged on an outer side surface of the second hub frame; the active small gear and the second gear pair meshing with the active small gear are arranged in the gear holder; the second hub frame defines a through hole communicating with an inner cavity of the gear holder, and the small gear in the second gear pair disposed in the gear holder passes through the through hole and meshes with the large gear in the first gear pair.

In some embodiments, an inner side surface of the second hub frame is arranged with a plurality of mounting columns, and an inner side surface of the first hub frame is arranged with a plurality of mounting sleeves each facing a corresponding mounting column in a one-to-one correspondence; a mounting groove is defined on an outer end surface of each mounting sleeve, and each mounting column is inserted into a corresponding mounting groove and connected to a corresponding mounting sleeve through a fastener.

In some embodiments, a rolling structure is arranged between the tire and the wheel hub, the rolling structure comprising a plurality of rollers rotatably disposed on the wheel hub, and an outer wheel surface of each roller rotatably abuts against an inner side surface of the tire.

In some embodiments, the tire comprises a left wheel body and a right wheel body; the left wheel body and the right wheel body are arranged on both sides of the wheel hub and capable of being interlocked with each other to cover the wheel hub; the right wheel body is fixedly arranged with a plurality of positioning columns in a one-piece structure with the right wheel body, and the left wheel body is fixedly arranged with a plurality of positioning sleeves each facing a corresponding positioning column in a one-to-one correspondence; a positioning groove is defined on an outer end surface of each positioning sleeve, and each positioning column is inserted into a corresponding positioning groove and fixedly connected to a corresponding positioning sleeve through a fastener. After the left wheel body and the right wheel body are fastened together, they are fixedly connected by bolts and other fasteners, which is convenient for disassembling and assembling and convenient for overhauling.

In some embodiments, the wheel hub defines a shaft hole passing through along an axial direction of the wheel hub, and the tire defines a mounting hole facing the shaft hole; a rotation shaft is fixedly disposed in the shaft hole, and a bearing is embedded in the mounting hole; the tire is rotatably disposed on the rotation shaft by means of the bearing.

In some embodiments, an outer end surface of the rotation shaft defines a threading hole along the axial direction, and an outer wall of the rotation shaft defines a wire outlet along the radial direction in communication with the threading hole; a threading pipe is threaded into the threading hole and is fixed to the wheel hub after being threaded out from the wire outlet, and a wire connected to the motor is arranged inside the threading pipe and extends out of the tire along the threading pipe.

In some embodiments, an inner side surface of each of the left wheel body and the right wheel body is arranged with a mounting ring, the mounting ring being disposed coaxially with the tire; the mounting ring separates an inner cavity of a corresponding one of the left wheel body and the right wheel body into an inner chamber and an outer chamber that are mutually independent; an inner wall of the inner chamber is arranged with a plurality of inner reinforcement bars radially set with a mounting hole as a center; an outer wall of the inner chamber is arranged with a plurality of outer reinforcement bars spaced along a perimeter of the mounting ring; each positioning column is arranged on a corresponding outer reinforcement bar of the right wheel body, and each positioning sleeve is fixedly arranged on a corresponding outer reinforcement bar of the left wheel body.

Compared with the related art, in the present disclosure, the motor is fixed on the wheel hub and the tire is driven to rotate through the motor, so as to realize the electrically-assisted forward movement, which makes the campervan move more effortlessly when carrying a larger weight.

BRIEF DESCRIPTION OF THE DRAWINGS

In order to more clearly illustrate the technical solutions in the embodiments or related art of the present disclosure, the accompanying drawings to be used in the description of the embodiments or related art will be briefly introduced below. It will be obvious that the accompanying drawings in the following description are only some of the embodiments of the present disclosure, and that for those skilled in the art, other drawings can be obtained on the basis of the accompanying drawings without creative labor.

Figure 1:
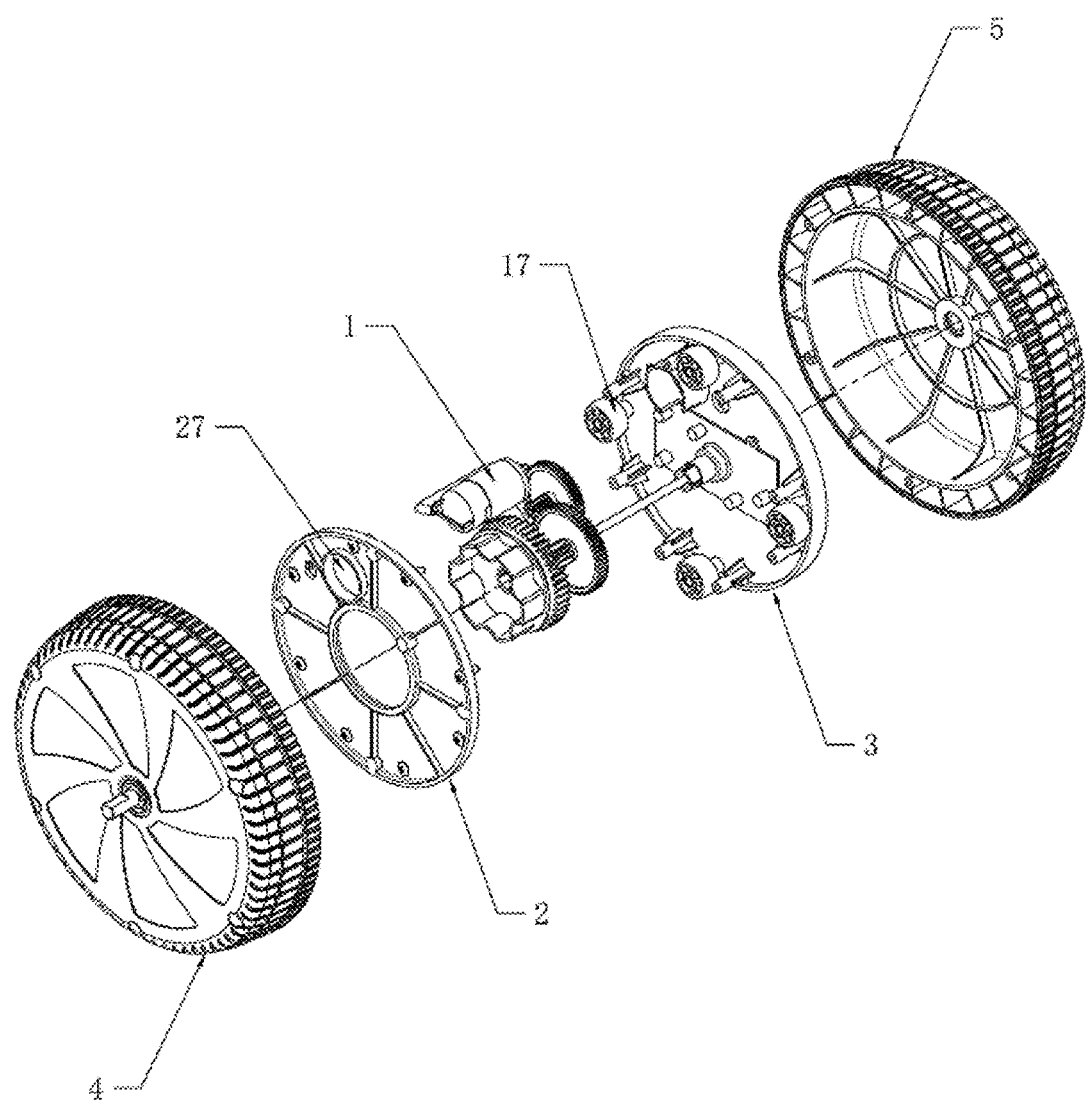
FIG. 1 is an overall structural schematic view of a driving device according to the present disclosure.

In the drawings: 1, motor; 2, first hub frame; 3, second hub frame; 4, left wheel body; 5, right wheel body; 6, positioning column; 7, positioning sleeve; 8, positioning groove; 9, mounting column; 12, rotation shaft; 13, threading pipe; 14, mounting ring; 15, inner reinforcement bar; 16, outer reinforcement bar; 17, roller; 18, cam key; 19, positioning hole; 20, positioning disk; 21, motor mounting seat; 22, gear holder; 23, active small gear; 24, driven large gear; 25, large gear; 26, small gear; 27, motor avoidance hole.

DETAILED DESCRIPTION

The following embodiments of the present disclosure and in conjunction with the accompanying drawings further describe the technical solution of the present disclosure, but the present disclosure is not limited to these embodiments.

As shown in FIG. 1, a driving device for a campervan described in the present disclosure includes a wheel hub, a motor 1, and a tire, where the tire is sleeved on the wheel hub and rotatable relative to the wheel hub, the motor 1 is fixedly disposed on the wheel hub and configured to drive the tire to rotate through a transmission mechanism. A rolling structure is arranged between the tire and the wheel hub, the rolling structure including multiple rollers 17 rotatably disposed on the wheel hub, and an outer wheel surface of each roller 17 rotatably abuts against an inner side surface of the tire.

Figure 4:
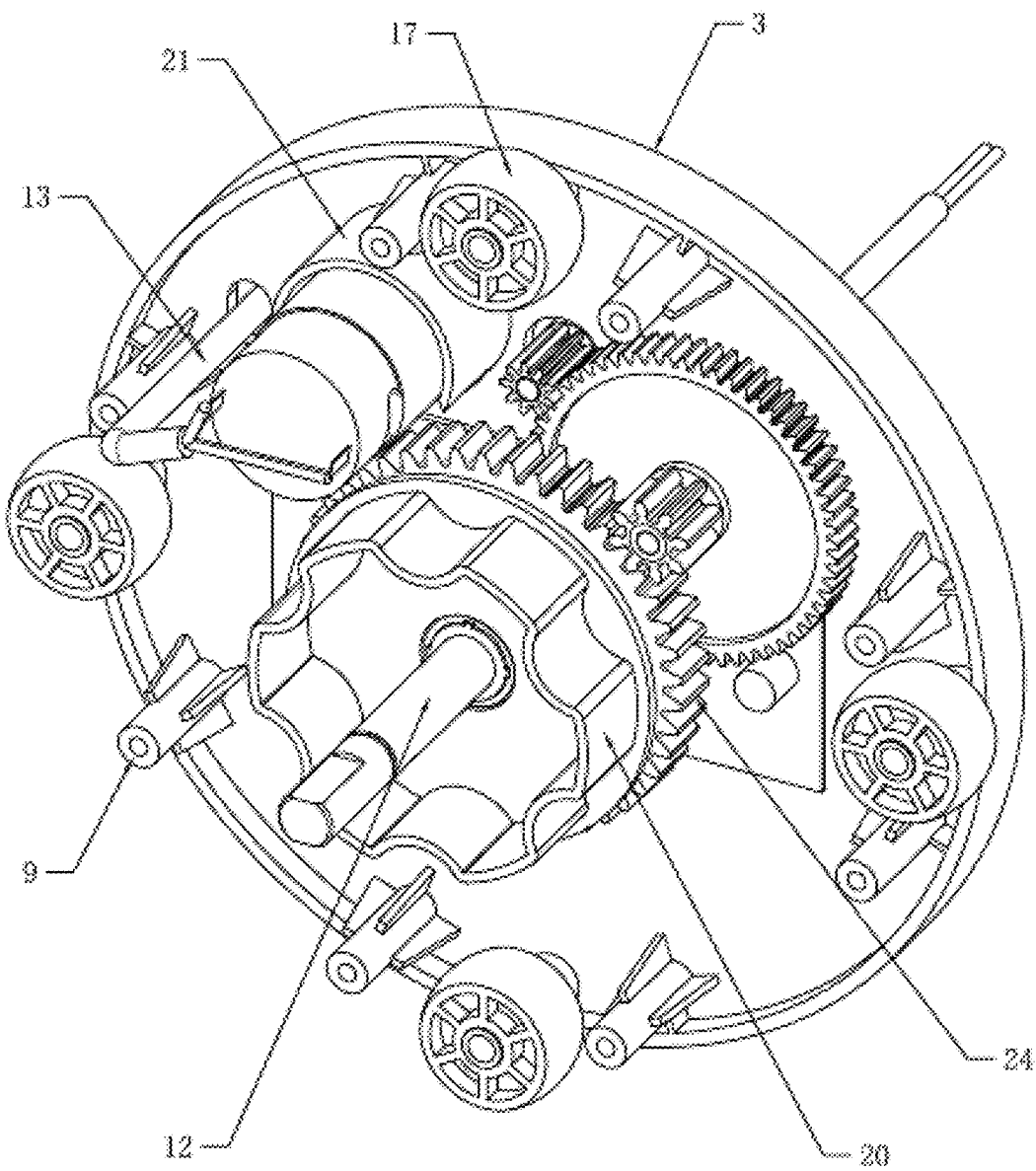
FIG. 4 is an assembled schematic view of a motor according to the present disclosure.
Figure 5:
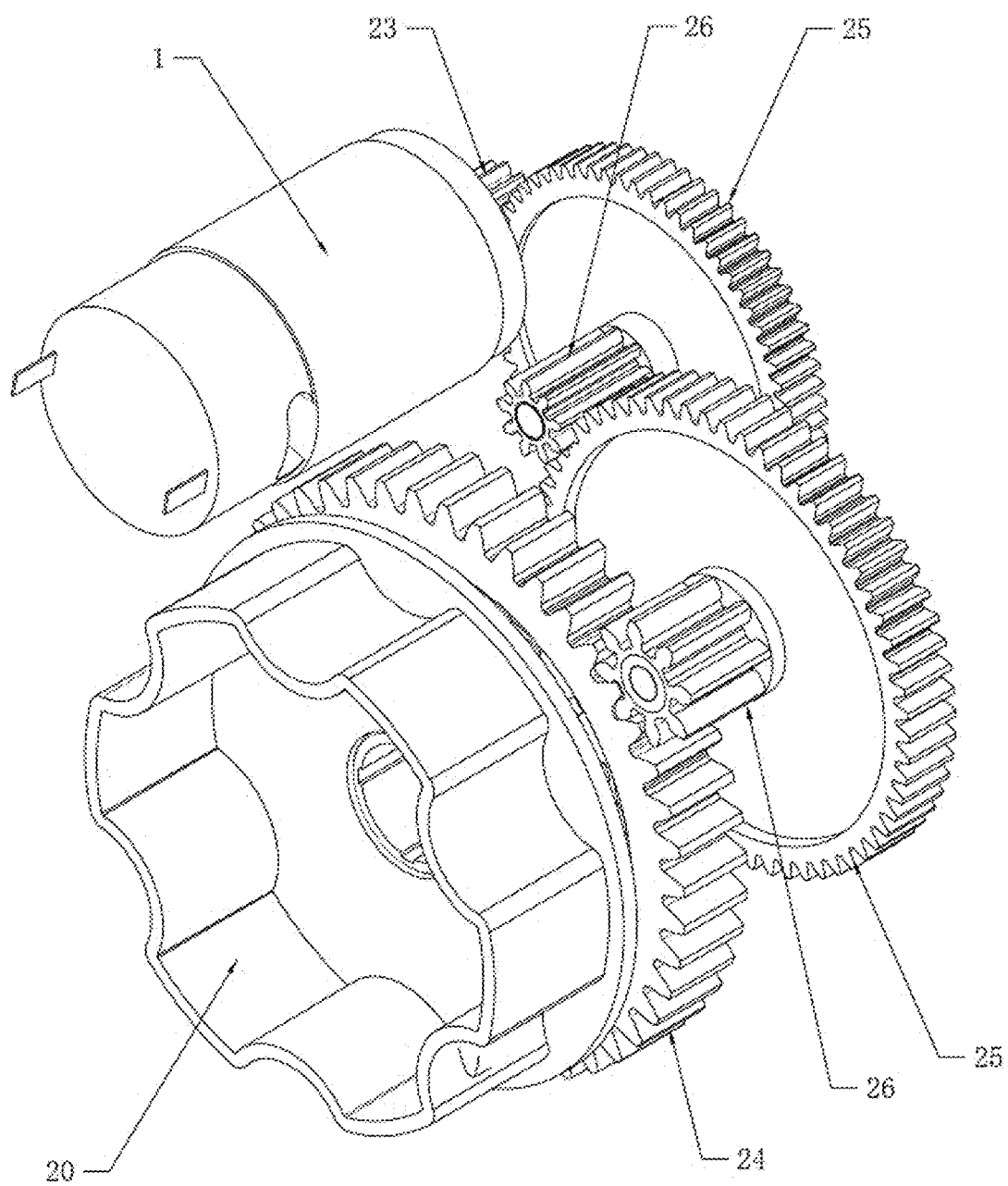
FIG. 5 is a structural schematic view of a transmission mechanism according to the present disclosure.

As shown in FIGS. 4 and 5, the transmission mechanism includes an active small gear 23 fixedly connected to an output shaft of the motor 1, a driven large gear 24 fixedly connected to the tire, and a reduction gear set rotatably disposed on the wheel hub and meshing with the active small gear 23 and the driven large gear 24, respectively; where the reduction gear set includes two gear pairs meshing with each other, each gear pair including a large gear 25 and a small gear 25 fixedly connected to each other and disposed in coaxial alignment; the small gear 26 in one of the two gear pairs meshes with the driven large gear 24, and the large gear 25 in the other of the two gear pairs meshes with the active small gear 23. The driven large gear 24 is detachably arranged on the tire by means of a socket structure, the socket structure including a positioning disk 20 fixedly connected to the driven large gear 24, a cam key 18 fixedly disposed on the tire, and a positioning hole 19 defined on the positioning disk 20; the positioning disk 20 is sleeved on the cam key 18 of the tire through the positioning hole 19; a cross-sectional shape of the positioning hole 19 is adapted to a cross-sectional shape of the cam key 18.

Figure 2:
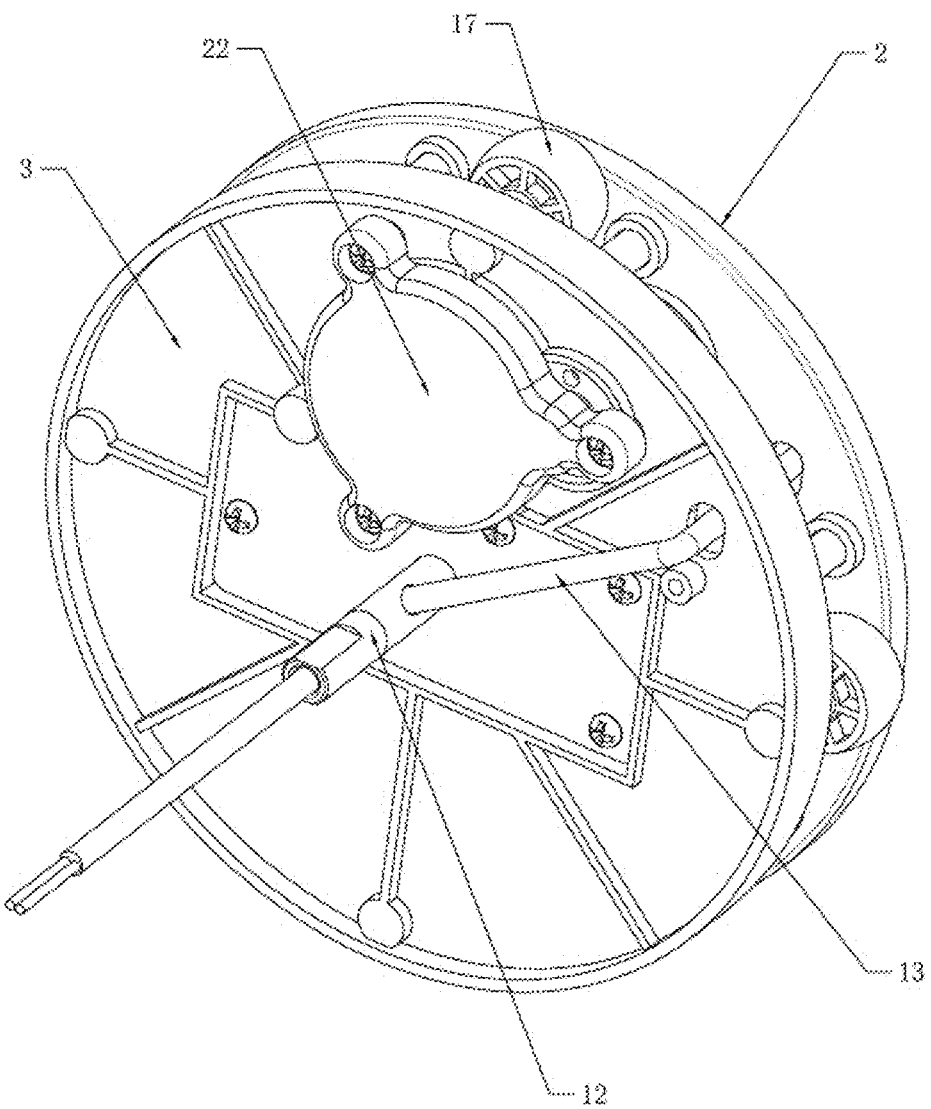
FIG. 2 is an overall structural schematic view of a wheel hub according to the present disclosure.
Figure 3:
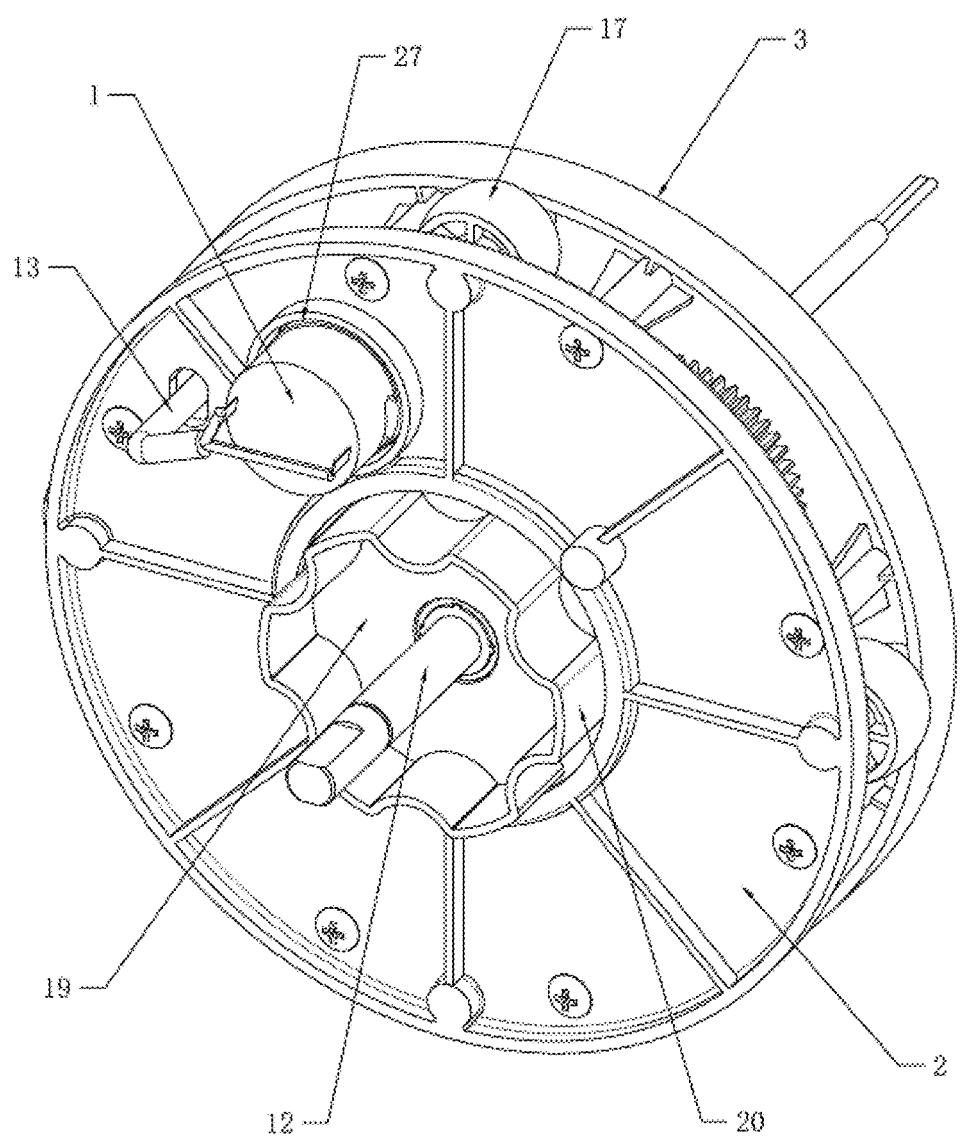
FIG. 3 is an overall structural schematic view of a wheel hub according to the present disclosure from another viewing angle.

As shown in FIGS. 2 and 3, the wheel hub includes a first hub frame 2 and a second hub frame 3; the first hub frame 2 defines a motor avoidance hole 27; the second hub frame 3 is arranged with a motor mounting seat 21 facing the motor avoidance hole 27, and the motor 1 passes through the motor avoidance hole 27 and is fixedly disposed in the motor mounting seat 21 to be fixedly connected to the second hub frame 3; an axis of the output shaft of the motor 1 is parallel to an axis of the wheel hub. An inner side surface of the second hub frame 3 is arranged with multiple mounting columns 9, and an inner side surface of the first hub frame 2 is arranged with multiple mounting sleeves each facing a corresponding mounting column 9 in a one-to-one correspondence; a mounting groove is defined on an outer end surface of each mounting sleeve, and each mounting column 9 is inserted into a corresponding mounting groove and connected to a corresponding mounting sleeve through a fastener.

As shown in FIG. 4, the output shaft of the motor 1 passes through the motor mounting seat 21 and then extends out of the second hub frame 3; a gear holder 22 is fixedly arranged on an outer side surface of the second hub frame 3; the active small gear 23 and the gear pair meshing with the active small gear 23 are arranged in the gear holder 22; the second hub frame 3 defines a through hole communicating with an inner cavity of the gear holder 22, and the small gear 26 in the gear pair disposed in the gear holder 22 passes through the through hole and meshes with the large gear 25 in the other gear pair.

Figure 6:
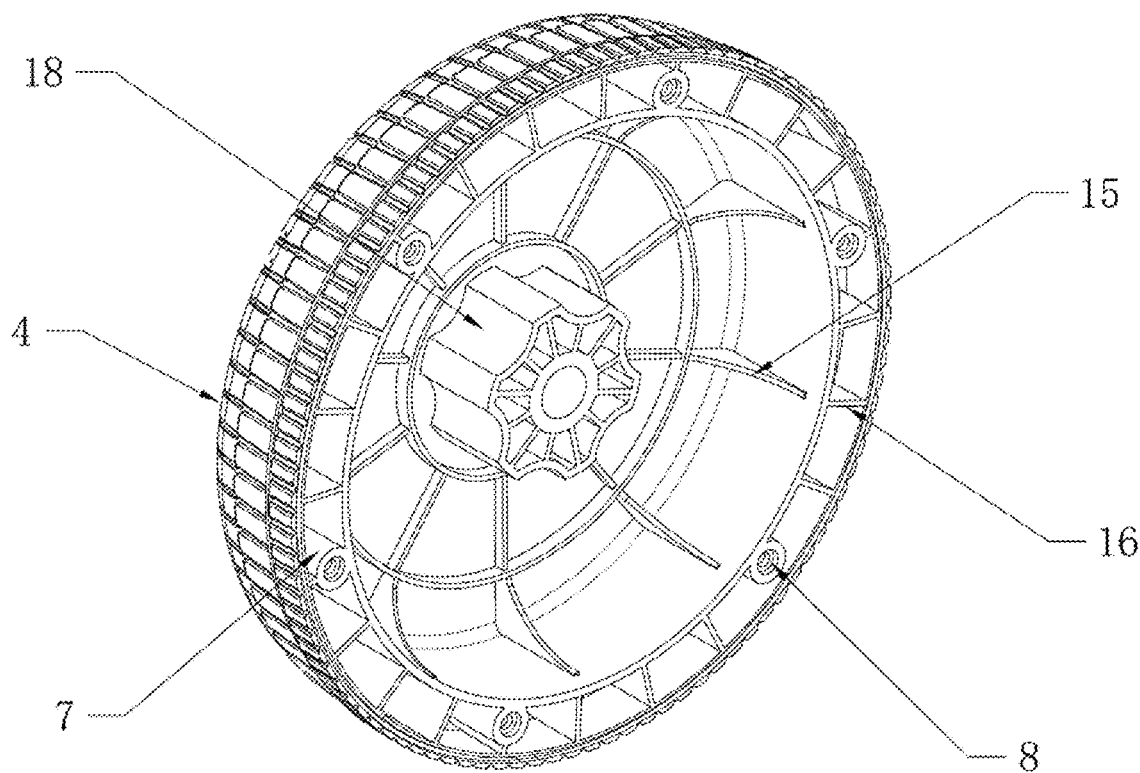
FIG. 6 is a structural schematic view of a left wheel body according to the present disclosure.
Figure 7:
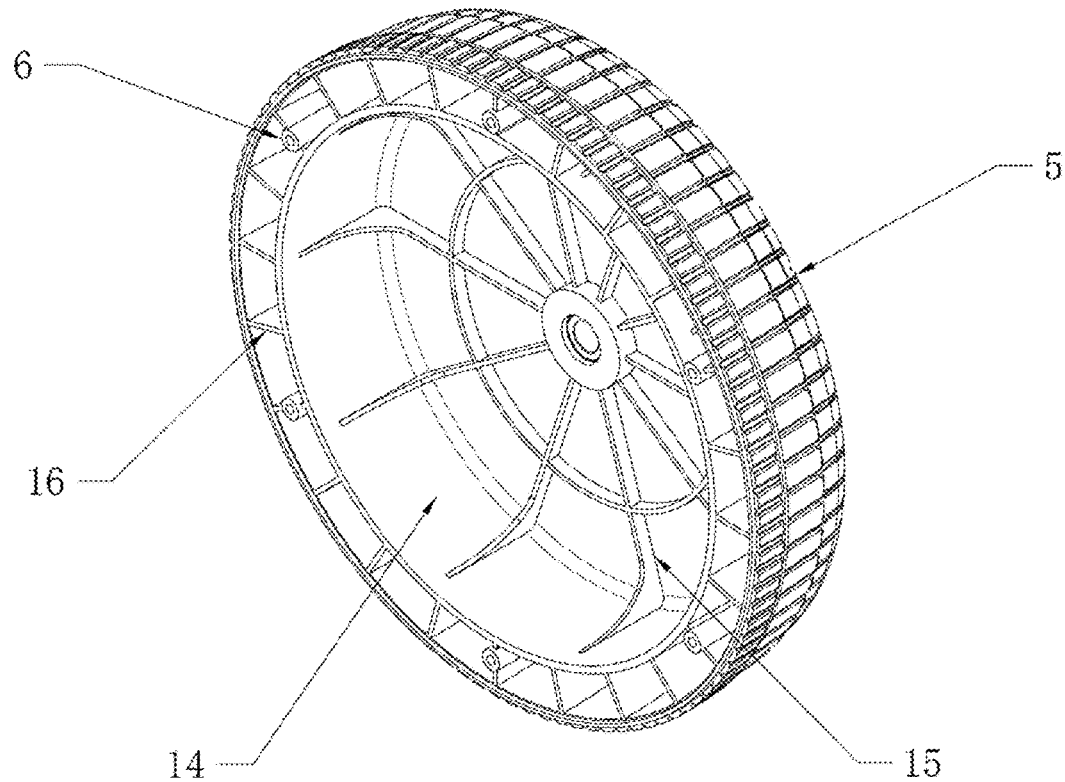
FIG. 7 is a structural schematic view of a right wheel body according to the present disclosure.

As shown in FIGS. 6 and 7, the tire includes a left wheel body 4 and a right wheel body 5; the left wheel body 4 and the right wheel body 5 are arranged on both sides of the wheel hub and capable of being interlocked with each other to cover the wheel hub; the right wheel body 5 is fixedly arranged with multiple positioning columns 6 in a one-piece structure with the right wheel body 5, and the left wheel body 4 is fixedly arranged with multiple positioning sleeves 7 each facing a corresponding positioning column 6 in a one-to-one correspondence; a positioning groove 8 is defined on an outer end surface of each positioning sleeve 7, and each positioning column 6 is inserted into a corresponding positioning groove 8 and fixedly connected to a corresponding positioning sleeve 7 through a fastener. After the left wheel body 4 and the right wheel body 5 are fastened together, they are fixedly connected by bolts and other fasteners, which is convenient for disassembling and assembling and convenient for overhauling.

An inner side surface of each of the left wheel body 4 and the right wheel body 5 is arranged with a mounting ring 14, the mounting ring 14 being disposed coaxially with the tire; the mounting ring 14 separates the inner cavity of the left wheel body 4/right wheel body 5 into an inner chamber and an outer chamber that are mutually independent, and an inner wall of the inner chamber is arranged with multiple inner reinforcement bars 15 radially set with a mounting hole as a center, and an outer wall of the inner chamber is arranged with multiple outer reinforcement bars 16 spaced along a perimeter of the mounting ring 14; each positioning column 6 is arranged on a corresponding outer reinforcement bar 16 of the right wheel body 5, and each positioning sleeve 7 is fixedly arranged on a corresponding outer reinforcement bar 16 of the left wheel body 4, thereby improving the connection strength of the left wheel body 4 and the right wheel body 5, the first hub frame 2, and the second hub frame 3.

As shown in FIGS. 2 and 3, the wheel hub defines a shaft hole passing through along an axial direction, and the tire defines a mounting hole facing the shaft hole; a rotation shaft 12 is fixedly disposed in the shaft hole, and a bearing is embedded in the mounting hole; the tire is rotatably disposed on the rotation shaft 12 by means of the bearing. An outer end surface of the rotation shaft 12 defines a threading hole along the axial direction, an outer wall of the rotation shaft defines a wire outlet along the radial direction in communication with the threading hole, a threading pipe 13 is threaded into the threading hole and is fixed to the wheel hub after being threaded out from the wire outlet, and a wire connected to the motor 1 is arranged inside the threading pipe 13 and extends out of the tire along the threading pipe 13. By providing a battery on the campervan to supply power to the motor 1, the wire between the battery and the motor 1 is lined up through the threading tube 13 as described above.

It should be understood that in the claims and specification of the present disclosure, all terms of "comprising" are to be understood as having an open-ended meaning, i.e., a meaning equivalent to "containing at least", and should not be construed as a closed-ended meaning, i.e., a meaning equivalent to "containing only . . . ".

The specific embodiments described herein are merely illustrative of the spirit of the present disclosure. Those skilled in the art to which the present disclosure belongs may make various modifications or additions to the specific embodiments described herein or adopt similar substitutions, but will not deviate from the spirit of the present disclosure or exceed the scope defined in the appended claims.

What is claimed is:
1. A driving device for a campervan, comprising:
   a wheel hub;
   a motor, disposed on the wheel hub; wherein an axis of an output shaft of the motor is parallel to an axis of the wheel hub; and
   a tire that encases the wheel hub and the motor; wherein the motor is configured to drive the tire to rotate through a transmission mechanism;
   wherein the transmission mechanism comprises an active small gear fixedly connected to the output shaft of the motor, a driven large gear fixedly connected to the tire, and a reduction gear set rotatably disposed on the wheel hub and meshing with the active small gear and the driven large gear, respectively; the reduction gear set comprises two gear pairs meshing with each other, each gear pair comprising a large gear and a small gear fixedly connected to each other and disposed in coaxial alignment; the small gear in one of the two gear pairs meshes with the driven large gear, and the large gear in the other of the two gear pairs meshes with the active small gear; the one of the two gear pairs is denoted as a first gear pair, and the other of the two gear pairs is denoted as a second gear pair;
   the driven large gear is detachably arranged on the tire by means of a socket structure, the socket structure comprising a positioning disk fixedly connected to the driven large gear, a cam key fixedly disposed on the tire, and a positioning hole defined on the positioning disk; the positioning disk is sleeved on the cam key through the positioning hole; a cross-sectional shape of the positioning hole is adapted to a cross-sectional shape of the cam key.

2. The driving device according to claim 1, wherein the wheel hub comprises a first hub frame and a second hub frame; the first hub frame defines a motor avoidance hole; the second hub frame is arranged with a motor mounting seat facing the motor avoidance hole, and the motor passes through the motor avoidance hole and is disposed in the motor mounting seat.

3. The driving device according to claim 2, wherein the output shaft of the motor passes through the motor mounting seat and extends outside of the second hub frame.

4. The driving device according to claim 3, wherein a gear holder is fixedly arranged on an outer side surface of the second hub frame; the active small gear and the second gear pair meshing with the active small gear are arranged in the gear holder.

5. The driving device according to claim 4, wherein the second hub frame defines a through hole communicating with an inner cavity of the gear holder, and the small gear in the second gear pair disposed in the gear holder passes through the through hole and meshes with the large gear in the first gear pair.

6. The driving device according to claim 2, wherein an inner side surface of the second hub frame is arranged with a plurality of mounting columns, and an inner side surface of the first hub frame is arranged with a plurality of mounting sleeves each facing a corresponding mounting column in a one-to-one correspondence.

7. The driving device according to claim 6, wherein a mounting groove is defined on an outer end surface of each mounting sleeve, and each mounting column is inserted into a corresponding mounting groove and connected to a corresponding mounting sleeve through a fastener.

8. The driving device according to claim 4, wherein a rolling structure is arranged between the tire and the wheel hub, the rolling structure comprising a plurality of rollers rotatably disposed on the wheel hub, and an outer wheel surface of each roller rotatably abuts against an inner side surface of the tire.

9. The driving device according to claim 1, wherein the tire comprises a left wheel body and a right wheel body; the left wheel body and the right wheel body are arranged on both sides of the wheel hub and capable of being interlocked with each other to enclose the wheel hub and the motor.

10. The driving device according to claim 9, wherein the right wheel body is fixedly arranged with a plurality of positioning columns in a one-piece structure with the right wheel body, and the left wheel body is fixedly arranged with a plurality of positioning sleeves each facing a corresponding positioning column in a one-to-one correspondence; a positioning groove is defined on an outer end surface of each positioning sleeve, and each positioning column is inserted into a corresponding positioning groove and fixedly connected to a corresponding positioning sleeve through a fastener.

11. The driving device according to claim 10, wherein an inner side surface of each of the left wheel body and the right wheel body is arranged with a mounting ring, the mounting ring being disposed coaxially with the tire; the mounting ring separates an inner cavity of a corresponding one of the left wheel body and the right wheel body into an inner chamber and an outer chamber that are mutually independent.

12. The driving device according to claim 11, wherein an inner wall of the inner chamber is arranged with a plurality of inner reinforcement bars radially set with a mounting hole as a center.

13. The driving device according to claim 12, wherein an outer wall of the inner chamber is arranged with a plurality of outer reinforcement bars spaced along a perimeter of the mounting ring.

14. The driving device according to claim 13, wherein each positioning column is arranged on a corresponding outer reinforcement bar of the right wheel body, and each positioning sleeve is fixedly arranged on a corresponding outer reinforcement bar of the left wheel body.

15. The driving device according to claim 1, wherein the wheel hub defines a shaft hole passing through along an axial direction of the wheel hub, and the tire defines a mounting hole facing the shaft hole; a rotation shaft is fixedly disposed in the shaft hole.

16. The driving device according to claim 15, wherein an outer end surface of the rotation shaft defines a threading hole along the axial direction, and an outer wall of the rotation shaft defines a wire outlet along the radial direction in communication with the threading hole; a threading pipe is threaded into the threading hole and is fixed to the wheel hub after being threaded out from the wire outlet, and a wire connected to the motor is arranged inside the threading pipe and extends out of the tire along the threading pipe.

* * * * *